United States Patent [19]

Hatch

[11] 4,168,446

[45] Sep. 18, 1979

[54] LIQUID METAL CURRENT COLLECTOR WITH COMPLIANT BRUSH HAVING FLOODED FILAMENTS

[75] Inventor: Burton D. Hatch, Ballston Lake, N.Y.

[73] Assignee: General Electric Company, Schenectady, N.Y.

[21] Appl. No.: 876,570

[22] Filed: Feb. 10, 1978

[51] Int. Cl.² ................................... H02K 13/00
[52] U.S. Cl. ............................. 310/219; 310/178
[58] Field of Search ............... 310/219, 178, 232, 243, 310/231, 248–251; 417/50; 339/5 L, 8 L

[56] References Cited

U.S. PATENT DOCUMENTS

| | | | |
|---|---|---|---|
| 3,989,968 | 11/1976 | Hatch | 310/11 |
| 4,024,422 | 5/1977 | Gill | 310/178 |
| 4,027,183 | 5/1977 | Hatch | 310/178 |
| 4,027,184 | 5/1977 | Hurley | 310/178 |

FOREIGN PATENT DOCUMENTS 1332786 10/1973 United Kingdom ................ 310/178
471633 9/1975 U.S.S.R. ............................ 310/219

*Primary Examiner*—R. Skudy
*Attorney, Agent, or Firm*—Nathan D. Herkamp; Joseph T. Cohen; Paul R. Webb, II

[57] ABSTRACT

An electrical current collector for an acyclic machine employs a rotor collector ring encircled by a stator collector ring to which a compliant brush of electrically conductive filaments is attached. The gap between rotor collector ring and stator collector ring, including brush interstices, is flooded with liquid metal which is drawn around the rotor collector ring periphery when rotation begins. A thin film of liquid metal on the brush makes sliding contact with the rotor collector ring, enhancing conductivity between the rotor and stator collector rings through the brush filaments.

11 Claims, 3 Drawing Figures

LIQUID METAL CURRENT COLLECTOR WITH COMPLIANT BRUSH HAVING FLOODED FILAMENTS

INTRODUCTION

This invention relates to acyclic machines employing liquid metal electrical current collectors, and more particularly to apparatus for maintaining electrical contact between the rotor collector ring and stator collector ring of a liquid metal current collector without expelling relatively large quantities of liquid metal.

In an acyclic machine using, instead of solid brushes, liquid metal current collectors in the shape of rings, the liquid metal forms a portion of the current-carrying loop. One of the problems associated with machines of this type concerns existence of Lorentz forces tending to expel liquid metal from the gap between each pair of rotor and stator collector rings. These forces are produced by electrical current passing through liquid metal in the presence of a magnetic field. A general approach to overcoming the adverse effects of Lorentz forces on liquid metal in the current collector of an acyclic machine involves employing these forces to recirculate the expelled liquid metal back into the current collector gap by selecting a particular flow path for the liquid metal as described and claimed in B. D. Hatch U.S. Pat. No. 3,989,968, issued Nov. 2, 1976 and assigned to the instant assignee, or by selecting a particular path for the armature current as described and claimed in J. D. Hurley U.S. Pat. No. 4,027,184, issued May 31, 1977 and assigned to the instant assignee.

In B. D. Hatch application Ser. No. 838,714, filed Oct. 3, 1977 and assigned to the instant assignee, liquid metal is confined within a raceway defined by a stator collector ring which includes a plurality of fins protruding radially-inward into a plurality of cage sectors, respectively, thereby essentially precluding expulsion of the liquid metal under the influence of Lorentz forces. In the present invention, however, the radial size of the gap between each pair of rotor and stator collector rings is significantly reduced, so that less liquid metal is employed therein. Consequently, less liquid metal is expelled from the gap, alleviating the requirement of continuously resupplying large quantities of liquid metal to the gap in order to assure continuous electrical performance of the collector. This is especially beneficial when employed at the high current densities and magnetic flux levels of the central collectors of a drum-type acyclic motor. Moreover, by utilizing a compliant brush in the gap, the dimensional allowances for manufacturing and assembly tolerances, thermal expansion, etc. are compensated by the compliance of the brush, so that spacing between paired rotor and stator collector rings can be greatly reduced.

Accordingly, one object of the invention is to provide a liquid metal current collector employing a very thin film of liquid metal in the current path between the rotor collector ring and stator collector ring.

Another object is to reduce the quantity of liquid metal that must be supplied to the gap between a rotor collector ring and a stator collector ring in order to replace liquid metal expelled therefrom by Lorentz forces.

Another object is to provide a liquid metal current collector wherein plaited compliant means attached to a stator collector ring and flooded with liquid metal rapidly wears down to conform to the maximum radius of a less than perfectly circular rotor collector ring.

Briefly, in accordance with a preferred embodiment of the invention, an electrical current collector for an acyclic machine comprises a rotor collector ring, and a stator collector ring concentrically encircling the rotor collector ring. The stator collector ring is attached to a compliant brush of conductive filaments closely adjacent, but out of contact with, the rotor collector ring. Liquid metal is situated between, and in contact with, the brush and the rotor collector ring. The liquid metal floods the region between the rotor and stator collector rings over at least a portion of the collector ring circumferences, filling interstices within the brush where the brush is immersed in the liquid metal.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
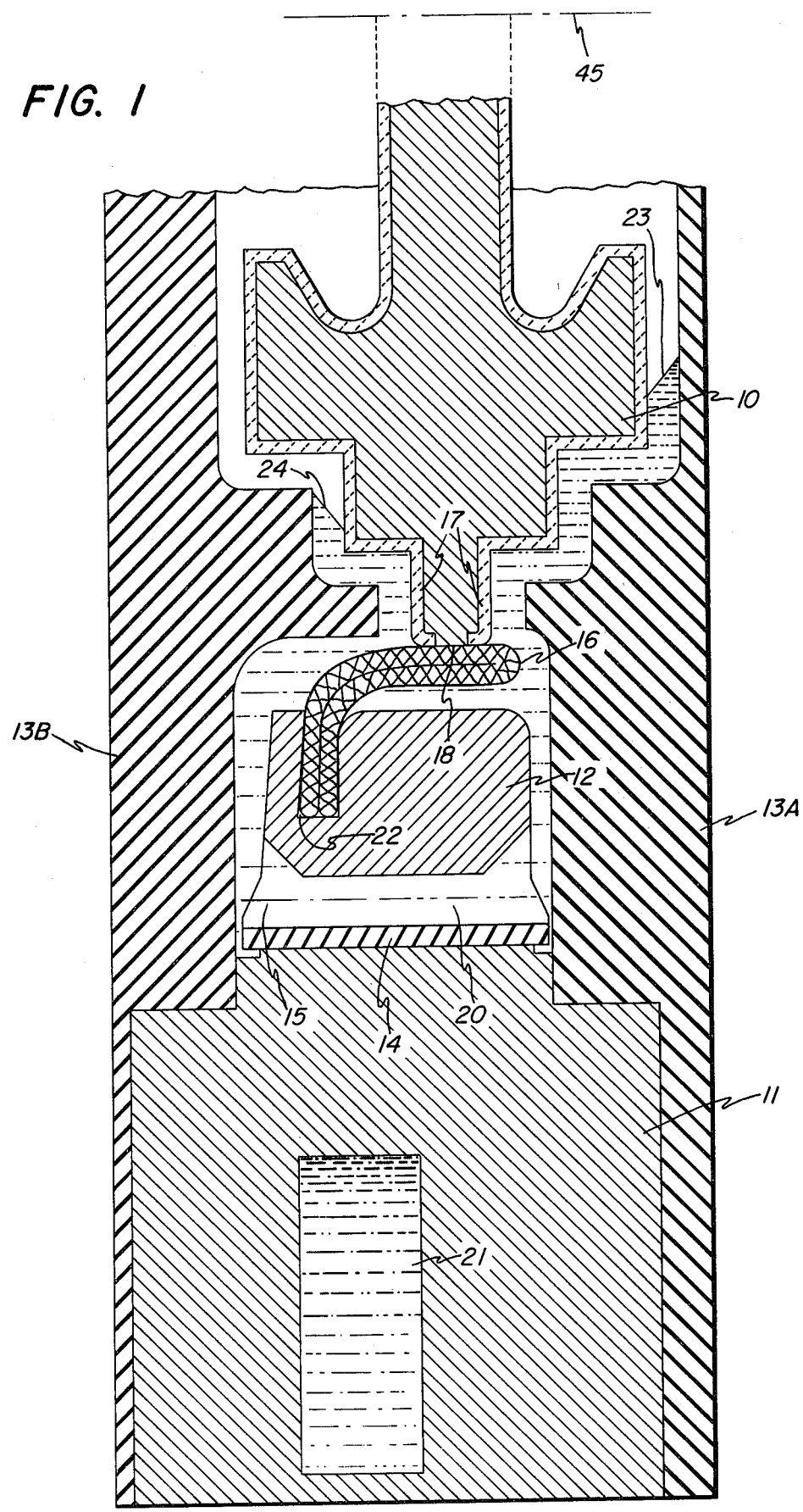
FIG. 1 is a cross sectional view of current collector apparatus constructed in accordance with one embodiment of the invention.

In FIG. 1, a rotor collector ring 10 of an acyclic machine, such as a motor, is illustrated as being encircled about its circumference by a stator collector ring 12. The motor rotates about an axis of rotation 45, and both the rotor and stator collector rings are concentric thereabout. Rotor collector ring 10, except for a portion 18 of the radially-outermost surface thereof, is completely coated with insulation 17. This insulation typically comprises a ceramic coating, such as sprayed alumina, which is subsequently vacuum-impregnated with an epoxy insulation.

Stator collector ring 12 contains a plurality of axially-oriented circumferential slots 20 therein, permitting passage of liquid metal, such as sodium-potassium for example, from one axial side of the stator collector ring to the other. Each of slots 20 contains an insulating material 14, such as a fiberglass insert, separating liquid metal 15 within the slot from the radially-outer portion 11 of the acyclic machine stator. Liquid coolant, such as turbine oil, circulating through a circumferential channel 21 in the stator helps prevent the stator from overheating.

At the radially-inner portion of stator collector ring 12 a mesh 16 of conductive filaments is affixed within a channel 22 in the stator collector ring. This mesh forms a compliant brush which initially is situated in rubbing contact with rotor collector ring tip 18. The brush is preformed into a circular configuration forming an approximate L-shape, in cross section, with one portion of the L imbedded within channel 22 and the other portion of the L exerting light contact pressure at rotor tip 18. The brush is of plaited construction and may comprise flat copper braid, available from New England Electric Wire Corporation, Lisbon, New Hampshire. The braid is preferably flattened and folded over to a double thickness before being formed into the circular, L-shaped configuration, and the free ends of the braid constitute the portion imbedded in groove 22. The braid is electron beam welded to stator collector ring 12 within groove 22 and, if preferred, stator collector ring 12 may first be crimped axially so as to support braid 16 firmly within the groove during the welding procedure. Since the filamentary material of brush 16 must be fully compatible with the liquid metal and exhibit long performance life in the liquid metal, and also must be wettable with the liquid metal so as to provide very low electrical resistance at the collector site, materials other than copper which may be employed in the braid are metallurgically-bonded copper-coated steel wire (e.g., 60% steel, 40% copper) and chromium copper alloy. For copper braid, size 48-8-36 has been found well suited for utilization in the invention. Also, various surface finishes, such as electroplated gold, silver, tin, nickel, etc. may be applied to both the solid and compliant copper or copper alloy surfaces of the collector to enhance wettability of these surfaces and reduce electrical resistance at the collector site.

The material of brush 16 desirably is elastically compliant with the dynamic (i.e., operationally induced) movements of rotor tip 18 about its mean, or average, position. These motions are of small magnitude, typically measured in thousands of an inch, in motors that are finish ground to tolerances of ±0.001 inches after final assembly of the rotor and collector ring constituent parts on the rotor and stator halves, respectively, of the motor. The cooling channel 21 in the copper stator ring and circulation of the sodium-potassium liquid metal as a coolant between the rotor and stator surfaces provide direct and uniformly distributed convective cooling of both rotor and stator parts, maintaining them at small differences in temperature with respect to each other as well as at small temperature differentials from start-up to full speed and full torque conditions. Thus the necessary elastic compliance of brush 16 is limited to a relatively small amount. The plastic formability of each brush 16 employed in the machine must also be sufficient to allow for manufacturing tolerances and be suited to final accurate setting into its desired position at each current collector at the time of final assembly as well as during earlier fabrication operations.

Acyclic machines having large gaps between rotor and stator (for example 0.050 inch clearances) have performed very satisfactorily at most speeds and have carried relatively large currents (e.g. 23,000 amperes) at low speeds and under locked rotor (i.e., zero speed) and full reversal conditions; however, it is desirable to provide for locked rotor and full reversal currents much higher than this. For this reason, the nonsolid gap between rotor 10 and stator 12 has been reduced to but a very small, thin film of liquid metal (e.g., 0.002 inches thickness) extant between brush 16 and rotor tip 18, and the collector site is flooded with liquid metal over a significant portion of the periphery of rotor 10, maintaining the gap filled with liquid metal in this peripheral portion. As rotation begins, the liquid metal is drawn around the periphery of rotor tip 18 by both frictional and Lorentz forces, filling the gap over the full periphery of rotor tip 18 so as to provide electrical connection of stator 12 from the entire circumference of rotor tip 18. The thin gap between rotor tip 18 and brush 16 is easily filled with liquid metal and maintained full since its small thickness frictionally retards escape of the liquid metal under the influence of Lorentz forces.

Large thickness gaps (e.g., 0.050 inches) have been required in previous machines to provide dimensional allowances for manufacturing, assembly, thermal expansion, etc. By using fine, high conductivity filaments (e.g., wires of approximately 0.005 inches diameter) in compliant brush 16, these mechanical allowances are provided by the compliance of the brush. The brush filaments then conduct the electrical current between stator ring 12 and the thin liquid metal-filled gap at rotor tip 18. The relatively high conductivity of the brush filaments with respect to that of the liquid metal results in relatively low electrical loss in brush 16, the resistance of the brush being but several micro-ohms.

As rotation of rotor collector ring 10 progresses, the relatively softer material of brush 16 becomes worn away by the harder rotor collector ring material (e.g., the ceramic insulation surface, typically sprayed alumina). This wear of brush 16 eventually removes the elastic compliance contact pressure on rotor collector ring tip 18, so that even the very slight eccentricity of the rotor tip results in a very thin gap between the rotor tip and brush 16 at their regions of mutual electrical (though not direct physical) contact. The rotor tip is preferably machined to be concentric within 0.001 inches Total Indicator Reading (i.e. with radial accuracy of ±0.0005 inches).

Stationary, insulating disks 13A and 13B on either side of rotor 10 and stator 12, and which, for example, may be comprised of fiberglass, provide containment for liquid metal in the spaces between either disk and each of these parts. These spaces are typically a minimum depth of about 0.050 inches. When the acyclic machine is operated at high speed, the liquid metal circulates around the complete periphery of rotor 10 and fills the radially-outermost portion of the space between the rotor and each of insulating disks 13A and 13B. Lorentz expulsion forces acting on the liquid metal in the thin gap between braid 16 and rotor tip 18 force a flow of liquid metal from one axial side of rotor 10 and stator 12, through the gap between braid 16 and rotor tip 18, to the other axial side of rotor 10 and stator 12, so that the liquid metal surface 23 on one axial side of the rotor is higher (i.e., closer to the center of rotation) than surface 24 of the liquid metal on the other axial side of rotor 10.

A combination of centrifugal and gravitational forces acting upon the liquid metal in the spaces between insulating disks 13A and 13B and each of rotor 10 and stator 12 causes an axial return flow of liquid metal through slots 20 from the high liquid metal side to the low liquid metal side (i.e., from the side having surface 23 to the side having surface 24). In this fashion, a flooded supply of liquid metal is maintained on the inlet side of the gap between braid 16 and rotor tip 18, supplying the quantity of liquid metal forced through the small, thin gap by the Lorentz expulsion forces acting on the liquid metal in the thin gap. These Lorentz expulsion forces result from interaction of direct current flowing between the rotor and stator collector rings and the circumferential magnetic field produced by this same current in all of the current collectors in the machine.

Figure 2:
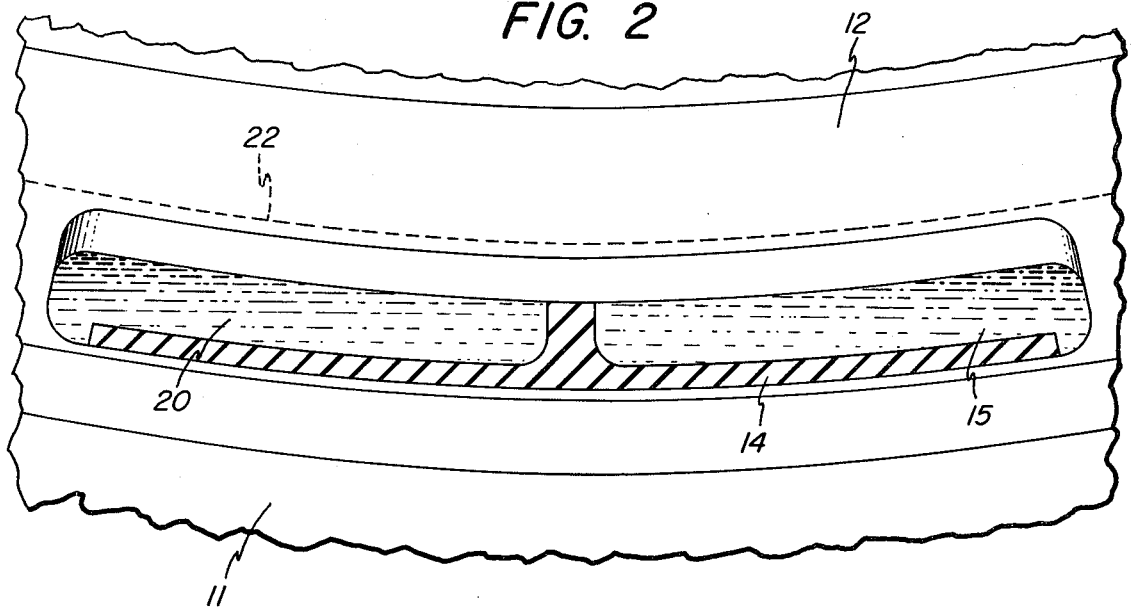
FIG. 2 is an axial end view of a peripheral segment of the current collector assembly shown in FIG. 1.

The configuration of a single one of slots 20 in stator collector ring 12, as viewed axially, is shown in FIG. 2 wherein like numerals represent like components. Fiberglass insert 14 is thus shown to be approximately T-shaped, the radial portion of the T being wedged tightly into the slot to cause the insert to bear firmly against the radially-outermost surface of slot 20 and thereby assure its mechanical retention in the slot. Radially-directed current is thus prevented from passing through liquid metal flowing through slot 20, so that Lorentz expulsion forces on the liquid metal within slot 20 tending to force liquid metal surface 23, shown in FIG. 1, to move radially-inward, cannot arise. As a result, liquid metal can circulate from each of slots 20 back to the gap between rotor tip 18 and brush 16, thus replenishing liquid metal pumped out of the gap by Lorentz expulsion forces. In a typical stator collector ring, any suitable number of slots 20 may be employed, with the separation between slots typically occupying about 50% to 75% of the periphery.

Whenever the rotor turns at a speed insufficiently high to produce viscous drag forces in the liquid metal which, together with the motoring forces generated in the liquid metal by the combination of the axial magnetic field and radial electrical current flowing through the collector, are insufficient to maintain electrical contact across the thin gap between brush 16 and rotor tip 18 over the full 360° periphery of the rotor tip, the electrically conductive, radial cross section of the gap becomes shorter in the circumferential direction (e.g., equal in area to the width of the spacing between ceramic insulation layers 17 on either axial side of the uninsulated portion of the rotor tip multiplied by a circumferential length of less than 360° of electrical contact between brush 16 and rotor tip 18 around the rotor tip radius.) This long, narrow cross section or radially-directed armature current produces its own encircling magnetic field. This field acts in a direction tending to curl the liquid metal of long, narrow cross section into a circular arc of smaller radius. This is termed the "pinch effect" and, in absence of an axial magnetic field such as is produced conventionally by an axial coil (not shown) in the acyclic machine, reduces the conducting area as it reduces the length (i.e., number of degrees of conducting arc) of the liquid metal in the thin gap between brush 16 and rotor 10, thus concentrating the current and increasing the magnitude of all of these Lorentz forces. The "pinch effect" also adds to the quantity of liquid metal being expelled from the thin gap and thus increases the quantity of liquid metal that must be resupplied to the inlet side of the gap and added to ends of the conducting arc to keep it circumferentially as large as possible. The quantity of resupplied liquid metal must, moreover, be large enough to allow the liquid metal in the gap to carry the large currents required during rapid reversal of the motor through zero speed, the latter currents ranging as high as 150% of full machine rating at full speed.

Because gravity forces are the only forces available, at very low speeds, to return the liquid metal to the inlet side of the conducting arc in the gap between brush 16 and rotor 10, the large reduction in quantity of liquid metal which must be resupplied to a thin gap (such as 0.002 inches) collector as compared to a large gap (0.050 inches for example) collector becomes very significant in its effects upon maximum current density which can be carried across the gap in the presence of the magnetic flux densities in the current collector regions. However, presence of an axial magnetic field, as produced by an axial coil (not shown) in the acyclic machine, together with radial current flow, results in torquing forces acting on the liquid metal. These torquing forces rotate the liquid metal about the entire circumference of the rotor collector ring. By thus spreading the liquid metal through a 360° arc about the rotor collector ring tip, the "pinch effect" is entirely avoided. However, interaction of the armature current flowing radially through the liquid metal in the thin gap between brush 16 and rotor tip 18, with the aforementioned axially-directed magnetic field, while torquing the liquid metal about the circumference of the rotor, does not change the axial (Lorentz) forces on the liquid metal and these axial flows still necessitate the axial return of the liquid metal to the inlet side of the collector over a sufficiently long portion of the circumference to resupply the liquid metal that is spread about the entire circumference of rotor collector ring 10.

Figure 3:
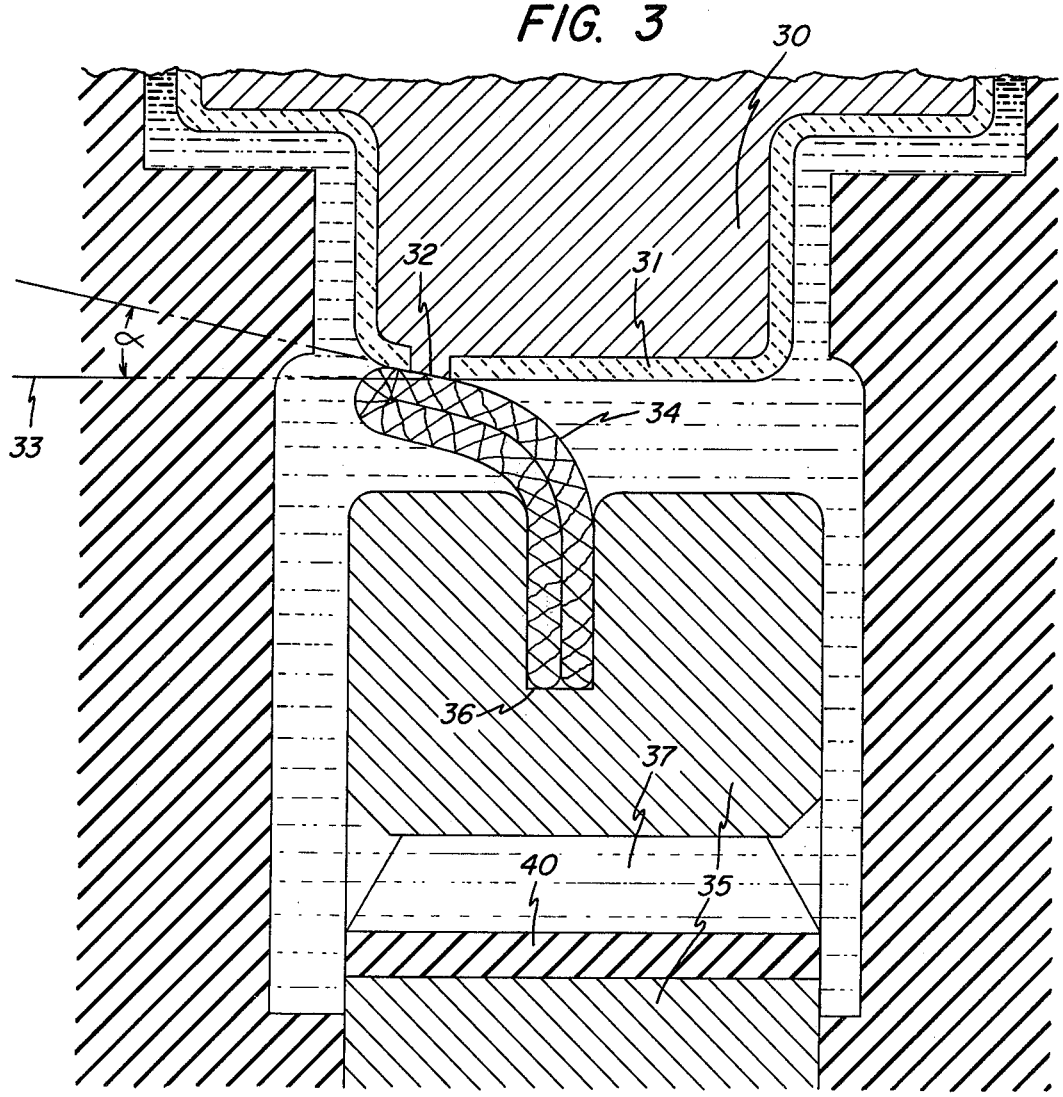
FIG. 3 is a cross sectional view of current collector apparatus constructed in accordance with a second embodiment of the invention.

FIG. 3 illustrates another embodiment of the invention which is preferred for those acyclic machines wherein the axially-directed magnetic field has a small radial component. This embodiment is advantageous where the combination of axial and radial magnetic fields produce a flux path which would result in a magnetomotive force differential across the cylindrical surface, including the uninsulated portion, of a rotor collector ring tip; that is, where magnetic flux lines penetrate the cylindrical surface of the rotor collector ring tip, a voltage drop is generated axially thereacross during operation of the machine. The operation of the axial voltage drop extant across the uninsulated cylindrical surface portion of the rotor collector ring tip thus establishes a circulating current through a path including a generally axial direction through the brush, which is comprised of lower resistivity material than the resistivity of the liquid metal and is at stator potential. This current path is completed through radial portions thereof extending through the liquid metal between the rotor and the brush. The circulating current reduces machine efficiency by causing power dissipation in the form of heat generated internally in the machine. By aligning conductive surface 32 at the rotor tip at a conical angle $\alpha$, so as to be parallel with the flux path, the electromotive force differential across this conductive surface is eliminated. The embodiment of FIG. 3 obviates this problem.

Thus in FIG. 3 a rotor collector ring 30 is illustrated having an insulating surface coating 31 thereon except at a region 32 extending circumferentially around the rotor collector ring. With respect to axial direction 33, the surface at region 32 is beveled at an angle $\alpha$, which is the angle at which the generally-axial magnetic flux traverses the outermost surface of rotor collector ring 30. A brush 34, comprised of material of the type employed in brush 16 shown in FIG. 1, is affixed in a slot 36 within stator collector ring 35, as by electron beam welding, so as to align itself alongside rotor surface region 32 and make light contact therewith initially. As brush 34 wears down slightly with rotor rotation, it maintains itself separated from rotor surface region 32 by a thin gap filled with liquid metal. As in the embodiment illustrated in FIG. 1, liquid metal pumped by Lorentz forces axially out of the gap between rotor surface region 32 and brush 34 is recirculated to the gap through axially-directed slots 37 in the stator collector ring. The return flow of liquid metal through each of slots partially interrupted radially by a separation in each slot resulting from presence of a respective insulating insert 40. This precludes radial current paths through the liquid metal in the slot, which would otherwise inhibit replenishment of the liquid metal pumped out of the gap between rotor outer surface 32 and brush 34 by tending to pump liquid metal in the same axial direction as the Lorentz forces acting on the liquid metal in the gap.

By slanting rotor surface region 32 at an angle α with respect to the axial direction, so that the surface region is parallel to the magnetic flux direction, no lines of flux penetrate this portion of the rotor surface. Consequently there is no magnetomotive force differential across this region, so that circulating currents through the current collector region are not present. Hence the generally axial magnetomotive force can be used more efficiently in generating useful power, since heat losses are greatly reduced from the condition where rotor surface region 32 would be aligned axially and therefore misaligned with the magnetic flux.

The foregoing describes a liquid metal current collector employing a very thin film of liquid metal in the current path between the rotor collector ring and stator collector ring. The invention reduces that quantity of liquid metal that must be supplied to the gap between the rotor and stator collector rings in order to replace liquid metal expelled therefrom by Lorentz forces. The invention is implemented by employing plaited compliant means flooded with liquid metal and attached to the stator collector ring, the compliant means rapidly wearing down to conform to the maximum radius of the less than perfectly circular rotor collector ring. Liquid metal current collectors which minimize power losses due to misalignment of axial magnetic fields are also described.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. An electrical current collector for an acyclic machine comprising:
    a rotor collector ring;
    a stator collector ring encircling said rotor collector ring;
    a compliant brush of electrically conductive filaments attached to said stator collector ring, said brush being closely adjacent said rotor collector ring; and
    liquid metal situated between, and in contact with, said brush and said rotor collector ring and flooding the region between said rotor and stator collector rings over at least a portion of the collector ring circumferences, said liquid metal filling interstices within said brush where said brush is immersed in said liquid metal.

2. The apparatus of claim 1 wherein the filaments of said compliant brush are plaited into braid.

3. The apparatus of claim 2 wherein said braid is affixed to said stator collector ring inside a radial groove therein.

4. The apparatus of claim 1 wherein said stator collector ring includes a plurality of circumferentially-displaced axial slots around said stator collector ring and in liquid metal communication with the region between said rotor and stator collector rings, each said slot including insulation means situated therein so as to substantially preclude passage of electrical current in a radial direction through liquid metal in said slot.

5. The apparatus of claim 4 wherein the filaments of said compliant brush are plaited into braid.

6. The apparatus of claim 1 wherein the radially-outermost surface of said rotor collector ring is beveled at an angle with respect to the longitudinal axis thereof, said compliant brush being situated at said angle where said brush is closely adjacent said stator collector ring, said angle corresponding to the direction of magnetic flux at the outermost surface of said rotor collector ring resulting from a generally-axial magnetic field passing through said apparatus.

7. The apparatus of claim 6 wherein the filaments of said compliant brush are plaited into braid.

8. The apparatus of claim 2 wherein said rotor collector ring is coated with insulation except at the region where said brush is situated closely adjacent thereto.

9. The apparatus of claim 7 wherein said rotor collector ring is coated with insulation except at the region where said brush is situated closely adjacent thereto.

10. The apparatus of claim 6 wherein said stator collector ring includes a plurality of circumferentially-displaced axial slots around said stator collector ring and in liquid metal communication with the region between said rotor and stator collector rings, each said slot including insulation means situated therein so as to substantially preclude passage of electrical current in a radial direction through liquid metal in said slot.

11. The apparatus of claim 10 wherein the filaments of said compliant brush are plaited into braid.

* * * * *